United States Patent

[11] 3,598,154

[72] Inventor Ben W. Brundage
 4390 Piedmont Ave., Oakland, Calif. 94611
[21] Appl. No. 841,913
[22] Filed July 15, 1969
[45] Patented Aug. 10, 1971
 Continuation of application Ser. No. 796,407, Feb. 4, 1969, now abandoned.

[54] LINE BLIND VALVE
 1 Claim, 11 Drawing Figs.
[52] U.S. Cl. ................................................ 138/94.3
[51] Int. Cl. .................................................. F16l 55/10
[50] Field of Search ........................................ 138/94.3, 94; 251/327; 137/269, 270, 270.5, 271

[56] References Cited
 UNITED STATES PATENTS
| 631,699 | 8/1899 | Darragh et al. | 251/327 X |
| 925,880 | 6/1909 | Doolittle | 251/327 |
| 2,309,304 | 1/1943 | Creighton | 138/94.3 |
| 2,743,742 | 5/1956 | Muff | 138/94.3 X |
| 2,861,599 | 11/1958 | Hamer | 138/94.3 |
| 3,165,124 | 1/1965 | Ausburn et al. | 138/94.3 |
| 3,342,217 | 9/1967 | Low | 138/94.3 |

OTHER REFERENCES
Jenkins Valves From Heating, Piping & Air Conditioning, April 1958, p. 178

Primary Examiner—Laverne D. Geiger
Assistant Examiner—Richard J. Sher
Attorney—Eckhoff & Hoppe ABSTRACT: A valve is provided which has only two positions of adjustment. In one position, complete flow is permitted through the valve while in the other position flow through the valve is positively cut off. Such a valve is highly desirable, for example, in a pipeline feeding a highly combustible fuel to a furnace or the like. When the furnace is not in use so that the workmen enter the furnace to perform various repair operations thereon, possibly using welding torches and the like, it is an absolute necessity that no combustible fuel be admitted to the furnace proper. If the flow of fuel is controlled only by a valve capable of movement between various positions of adjustment it is possible, and, unhappily, this has happened that any fuel entering the furnace may be ignited with disastrous results.

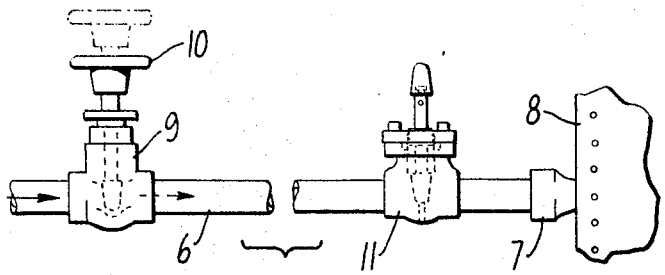
FIG. 1.
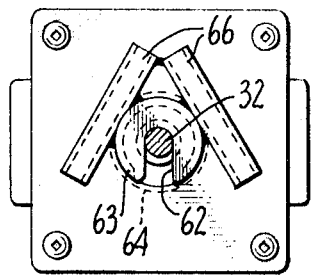
FIG. 6.
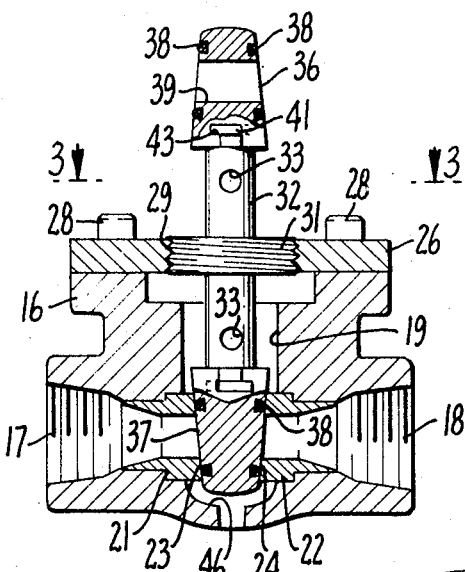
FIG. 2.
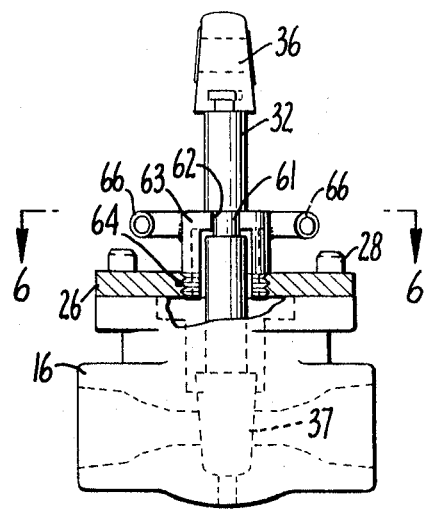
FIG. 5.
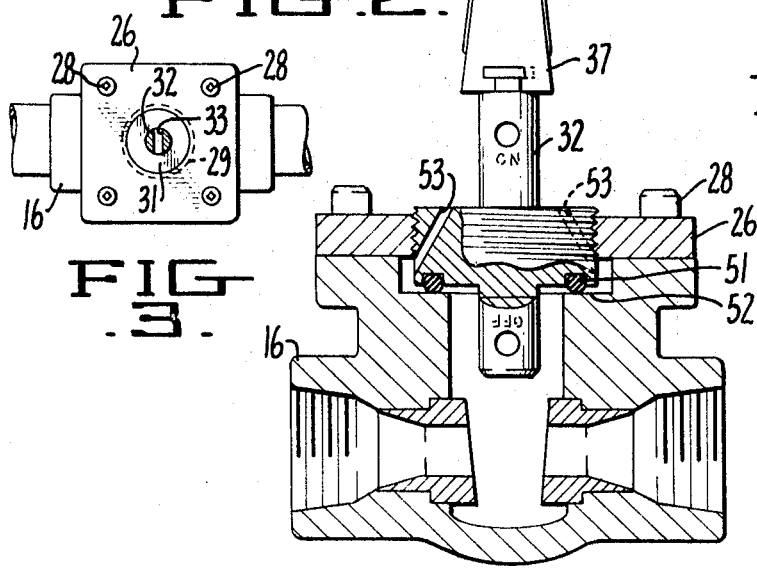
FIG. 3.
FIG. 4.
INVENTOR.
BEN W. BRUNDAGE
ATTORNEYS

INVENTOR.
BEN W. BRUNDAGE
BY
ATTORNEYS

INVENTOR.
BEN W. BRUNDAGE
BY
ATTORNEYS

LINE BLIND VALVE

This application is a continuation-in-part of my copending application Ser. No. 796,407 now abandoned filed Feb. 4, 1969 and entitled LINE BLIND VALVE.

This invention relates generally to valves and particularly to what is known as a "line blind valve," one capable of insertion in a pipeline and having a movable valve element which can be positioned selectively in either of two positions, in one of which full flow through the valve body can occur while in the other position flow through the valve is positively cut off and any leakage ahead of the valve closure member is to the atmosphere outside of the furnace.

In accordance with this invention, a line blind valve is provided which is capable of either permitting a full flow or no flow at all. In the latter case, the valve is suitably vented to the atmosphere so that the pressure cannot build up in the valve on the downstream side of the valve.

Other features and objects of the invention will become apparent in view of the following detailed description and the accompanying drawings in which:

FIG. 1 is a schematic view showing an installation made in accordance with the present invention;

FIG. 2 is a side elevation, partly in section, through a line blind valve embodying the present invention;

FIG. 3 is a section taken along the line 3–3 of FIG. 2;

FIG. 4 is a side elevation, partly in section, showing another form of line blind valve embodying the present invention;

FIG. 5 is a side elevation, partly in section, showing another line blind valve of the present invention;

FIG. 6 is a view taken along the line 6–6 of FIG. 5;

Figure 7:
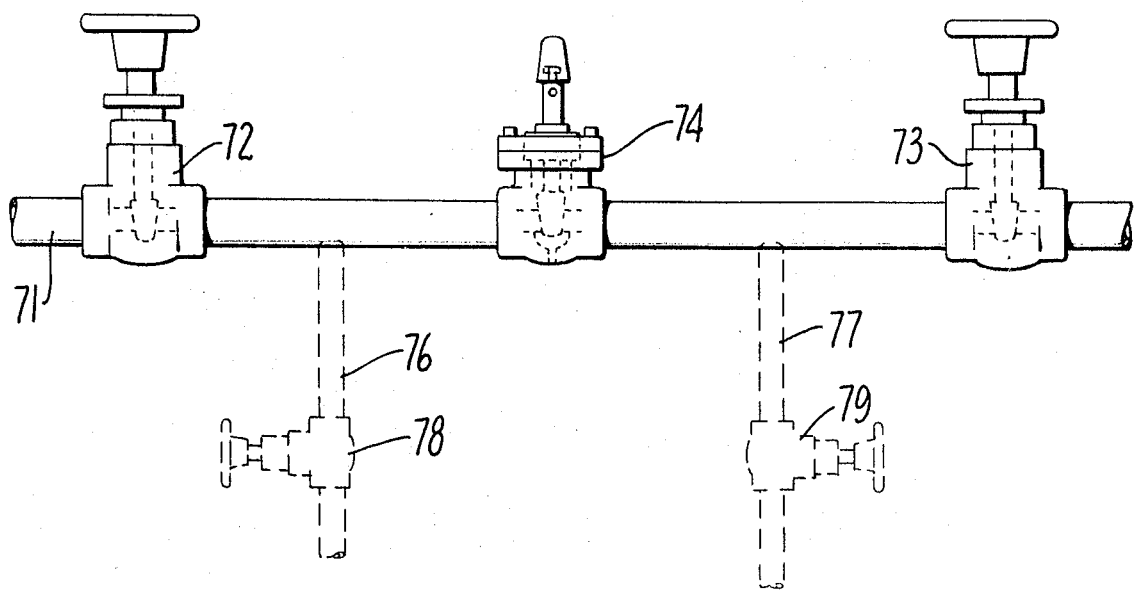
FIG. 7 is a schematic view showing another manner of installation of the line blind of the present invention.

Referring particularly to FIG. 1, a combustible fuel is fed through the line 6 to a burner 7 installed in a furnace or heater housing 8. The rate of flow of the fuel is regulated by the valve 9 which includes a valve element movable selectively to various positions between a full-closed and full-open position as by the handwheel 10. In accordance with the present invention, there is provided between the valve 9 and the burner 7 a line blind valve, generally indicated at 11, which forms generally the subject of the present invention.

Referring particularly to the line blind as shown in FIGS. 2 and 3, this includes a valve body 16 usually provided by a steel forging. The body includes a threaded inlet 17 and a threaded outlet 18 enabling the valve to be mounted as in the pipeline 6. The valve body includes a central annular aperture 19 through which valve seat members 21 and 22 are inserted and positioned in the valve body. The opposite faces on valve seat members 21 and 22, namely faces 23 and 24, are preferably faced with a hard surface material such as STELLITE or the like. A plate 26 is mounted on the top of the valve body by studs 28.

The plate is threaded centrally as at 29 to receive a threaded member 31 secured on a valve rod 32. The valve stem 32 is provided with apertures 33 on opposite sides thereof to receive a turning rod or bar, not shown, but which when inserted can be used to turn the valve rod to screw the threaded member 31 into position in the threaded plate 29. Mounted on opposite sides of the threaded member 31 on the valve rod 32 are valve members 36 and 37. Each valve member includes O sealing rings 38 made of a synthetic flexible material. Valve member 36 has a passage 39 therethrough while the valve member 37 is solid. Each of the valve members is mounted upon a T-shaped projection 41 provided on the end of the valve rod 32, each T-end being received in a like slot 43 in each of the valve members.

In the position of adjustment shown in FIG. 2, the solid valve member 37 has been forced into positive sealing engagement with the opposite faces 23 and 24 on the seating members 21 and 22. If any gas should escape past the upstream side of the valve member 37, it is vented to the atmosphere through the passage 46 in the valve member which passage is open to the atmosphere.

In that form of the invention shown in FIG. 4, the valve member 36, having the passage 39 therethrough, has been omitted and only the solid valve member 37 is mounted on the end of the rod 32. As appears in FIG. 4, gas can flow freely through the device and any escape of gas is prevented in this position of adjustment by provision of the sealing O rings 51 in engagement with shoulder 52 on the valve body. Also, in this modification, plate 26 is secured firmly against the top of the valve body by the studs 28.

In that position in which the line blind valve is shown in FIG. 4, it is closed against gas escape by the engagement of the O sealing ring 51 with the shoulder 52. When the valve rod is reversed and the solid valve member 37 is in position, any gas escaping past the valve member 37 can exit to the atmosphere through the ports 53. In the position of adjustment shown in FIG. 4, the ports 53 are cut off from communication with the interior of the valve body by the O sealing rings 51.

In the modification shown in FIGS. 5 and 6, the valve rod 32 includes an annular recess 61 to receive a slot 62 in an annular member 63, the latter being threaded on its lower end as at 64. When it is desired to reverse the position of the valve members 36 and 37, the annular member is removed from its threaded engagement with the plate 26 by inserting a rod in one or more of the tubes 66 welded to the sides of the annular member 63. When release of the annular member from the plate has been effected, the valve rod 32 is removed from engagement with the slot 62, the rod is reversed, reengaged with the threaded annular member which is then returned to engagement with the threads in the plate 26.

Referring to the modification shown in FIGS. 6 and 7, I have shown diagrammatically an installation for the handling of a liquefied gas such as liquid butane or propane. Line 71 includes spaced valves 72 and 73. A line blind, generally indicated at 74, is usually mounted between the valves 72 and 73 and is used to cut off positively and with assurance the flow of the liquified gas through line 71. The permit the draining of any liquified gas contained between the valves 72 and 73 so that the line blind can be reversed in position, it has been the practice heretofore to mount bleed lined 76 and 77 on either side of the line blind, the release of liquified gas from the bleed lines being controlled by valves 78 and 79. When it was desired to install the line blind valve element in flow cutoff position, it was necessary to open the valves 78 and 79 and bleed off any liquified gas contained between the closed valves 72 and 73.

Figure 8:
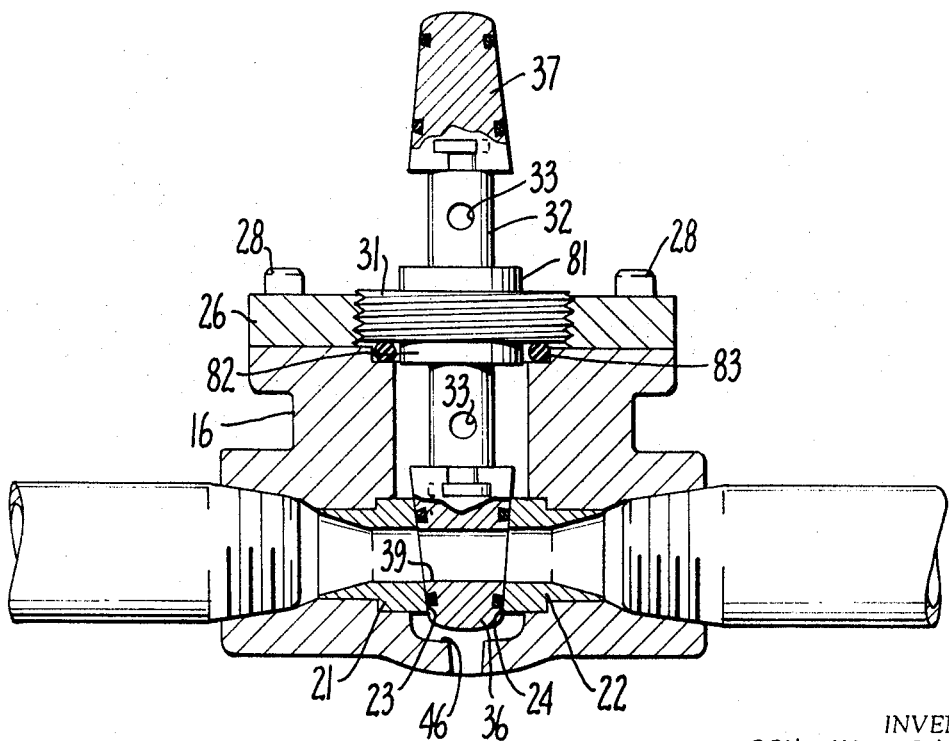
FIG. 8 is a cross section of a modified form of line blind used in the installation shown in FIG. 7.

By utilizing the modified form of line blind shown in FIG. 8, it is possible to eliminate the drain lines 76 and 77 and valves 78 and 79. To achieve this, I provide collars 81 and 82 on either side of the threaded member 31, the collars and threaded member being secured to the valve rod 32. Also, I provide a recess 82 in the top of the valve body 16 and in this recess I mount an O-ring 83 to act as a seal against the collars 81 and 82. When it is desired to free that portion of the line 71 between the valves 72 and 73 of any contained liquified gas, it is merely necessary to raise the line blind by inserting a rod or bar in apertures 33 in the valve rod 32 and rotating the valve rod and thus lift the line blind slightly so that any liquified gas in the line can escape through the passage 46 provided in the valve body and which is open to the atmosphere. When the line has been drained, the position of the valve members 36 and 37 can be reversed; the blind valve member 37 being inserted in the line so that if any liquified gas should pass the valve 72, it cannot pass the line blind valve.

Figure 9:
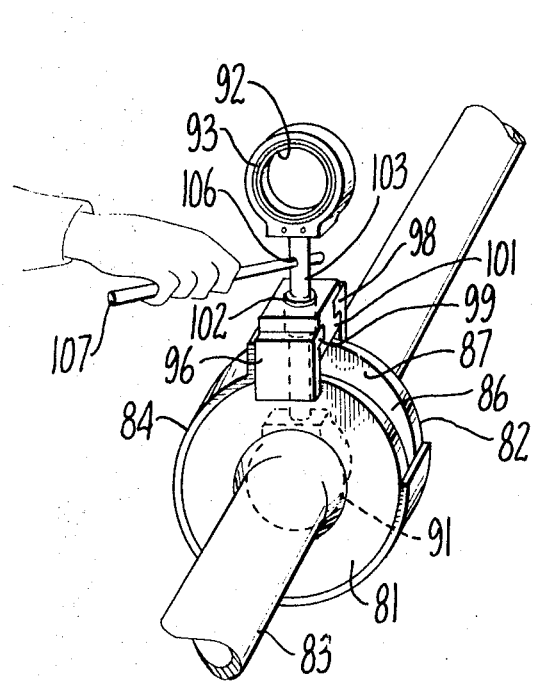
FIG. 9 is a perspective view showing another form of line blind installed and in use.
Figure 10:
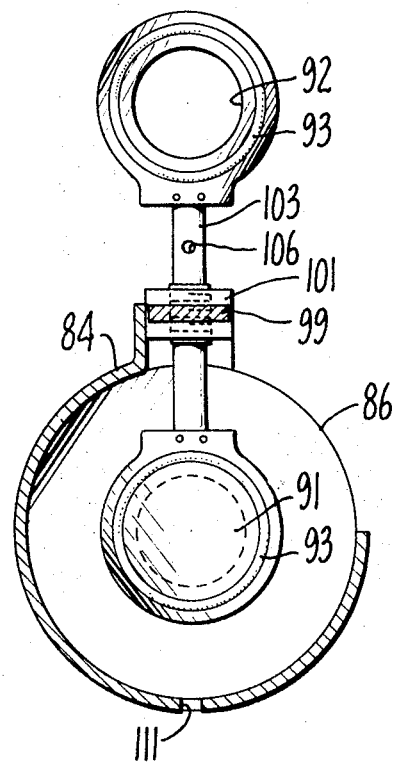
FIG. 10 is an end elevation partly in section of the line blind shown in FIG. 9.
Figure 11:
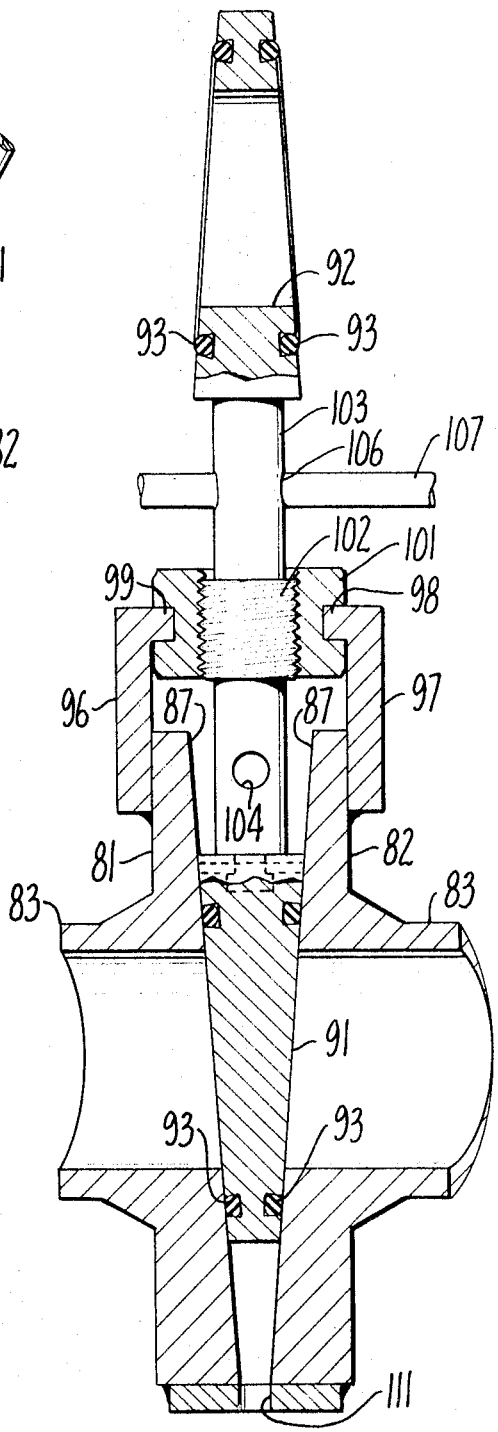
FIG. 11 is a vertical section taken through the form of line blind shown in FIGS. 9 and 10.

In that form of line blind shown in FIGS. 9—11, two opposite like valve body members 81 and 82 are provided. In the form shown, each has a central tubular portion 83 which enables the assembled line blind to be welded into place in a pipeline, as is shown, for example, in FIG. 9. The valve members 81 and 82 are joined together by strap member 84 which is welded to the valve members 81 and 82 and to extend substantially completely around them leaving only an open space as indicated at 86 in FIGS. 9 and 10. This is so that a person manipulating the line blind can stand to the left of the blind as it appears in FIG. 9 and manipulate the device. Any release of gas or fluid from the pipeline will then occur through the open space 86 and will be directed away from the operator.

Each of the valve members 81 and 82 includes an annular face 87 which tapers to the bottom of the valve members 81 and 82 to provide a seat for either of the valve members 91 or 92. In the form shown, valve member 91 is in place, this being a solid member having O-rings 93 extending about the valve member. Valve member 92 is similar to valve member 91 except that it is open. Mounted on the upper end of each of valve members 81 and 82 are members 96 and 97, each having an inwardly extending flange 98 which ride in corresponding slots 99 provided in the threaded nut 101. Engaged with the nut 101 is the threaded portion 102 provided centrally of rod 103 and which connects the two valve members 91 and 92, the rod having a T-projection 41 at each end fitting in a slot 43 in each of the valve members. Rod 103 includes passages 104 and 106 on either side of the thread 102 to permit insertion of a rod 107.

In practice, if it is desired to close off the line in which the line blind is provided, the solid valve member 91 is moved into position and rod 103 is turned until the member 91 seats positively on the faces 87 of members 81 and 82. It is to be noted particularly that each of the valve members 91 and 92 extend for a substantial distance on either side of the passage through members 81 and 82 so that even if the O-rings 93 should fail in any instance, a positive metal-to-metal engagement is provided by the areas on either side of the O-rings, thus ensuring that a positive closure is available.

Any liquid collecting in the line blind is removed through the drain 111 provided in the bottom of member 84.

From the foregoing, it will be apparent I have provided a novel form of line blind valve.

I claim:

1. In a line blind valve having a valve body with a passage therethrough, the opposite valve seating members positioned in a spaced relation across said passage with the seats on such members each flared outwardly at an acute angle to a plane normal to said passage, a rod having a threaded portion midway of its length and also having a wedge-shaped valve member at each end thereof, one of said valve members being solid and the other having an aperture therein, such valve members each being adapted to fit snugly between said valve seating members in a seating position one to permit fluid flow through the valve body and the other to cut off any fluid flow through the valve body, each of the valve members being mounted rotatably at opposite ends of said rod, the upper end of the valve body having a threaded nut mounted thereon to receive the threaded portion on the rod to enable each of the valve members to be forced selectively into seating position between the opposite valve seating members.